United States Patent [19]

Cartner

[11] Patent Number: 4,502,269
[45] Date of Patent: Mar. 5, 1985

[54] HYDRAULIC MOWER HEAD ORIENTING APPARATUS FOR BOOM MOWERS

[76] Inventor: Jack O. Cartner, 1005 N. 8th St., Cambridge, Ohio 43725

[21] Appl. No.: 416,596

[22] Filed: Sep. 10, 1982

[51] Int. Cl.³ ............................................. A01D 35/28
[52] U.S. Cl. ..................................... 56/15.5; 56/10.7; 56/15.2
[58] Field of Search ...................... 56/10.7, 15.7, 15.4, 56/15.5, 15.6, 15.2; 37/80 R

[56] References Cited

U.S. PATENT DOCUMENTS

| | | | |
|---|---|---|---|
| 3,087,296 | 4/1963 | Cowles | 56/10.7 |
| 3,319,407 | 5/1967 | Jordan et al. | 56/15.2 |
| 3,559,385 | 2/1971 | Eaton | 56/10.7 |
| 3,624,698 | 11/1971 | Storm | 56/10.7 |
| 3,653,193 | 4/1972 | Coughran | 56/10.7 |
| 3,949,539 | 4/1976 | Cartner | 56/15.5 |
| 4,241,565 | 12/1980 | Parsons, Jr. | 56/10.7 |

FOREIGN PATENT DOCUMENTS 56-150235  11/1981  Japan ................................. 37/80 R

OTHER PUBLICATIONS

Woods model S260, "ditchbank mower", data sheet.
Woods model H-S 105/106, data sheet.
The Triumph 2500 Series; 3500 Series; 5000 Series; 6000 Series; and 8500 Series.

Primary Examiner—Gene Mancene
Assistant Examiner—David L. Tarnoff
Attorney, Agent, or Firm—Fay & Sharpe

[57] ABSTRACT

A boom assembly (B) is pivotally connected at one end with a prime mover (A) and at a second end with a mowing apparatus (C). An orientation control (D) controls the orientation of the mowing apparatus relative to the boom assembly such that the mowing apparatus can mow vegetation on vertical, sloping, or level areas with the boom positioned with varying degrees of extension. The orientation control (D) includes a hydraulic cylinder (60) which is pivotally connected at one end with the boom assembly and at its other end with a linkage assembly (62). The linkage assembly includes a first link (64) which is pivotally connected with the boom assembly and a second link (68) which is pivotally connected with the mowing apparatus and the first link. The linkage assembly converts the longitudinal extensive and contractive movement of the hydraulic cylinder into substantially 180° of relative rotational movement between the mowing apparatus and the boom assembly.

2 Claims, 4 Drawing Figures

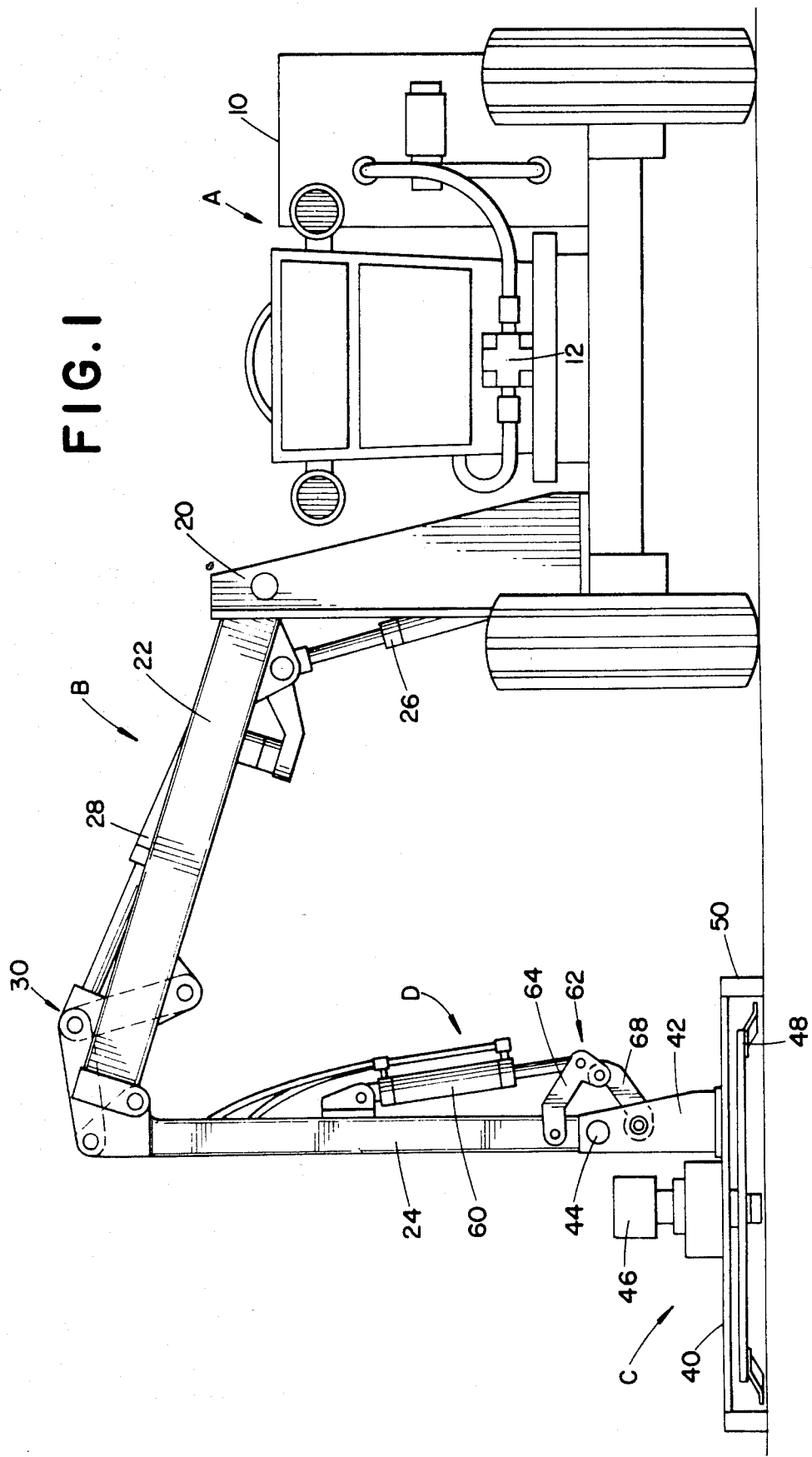

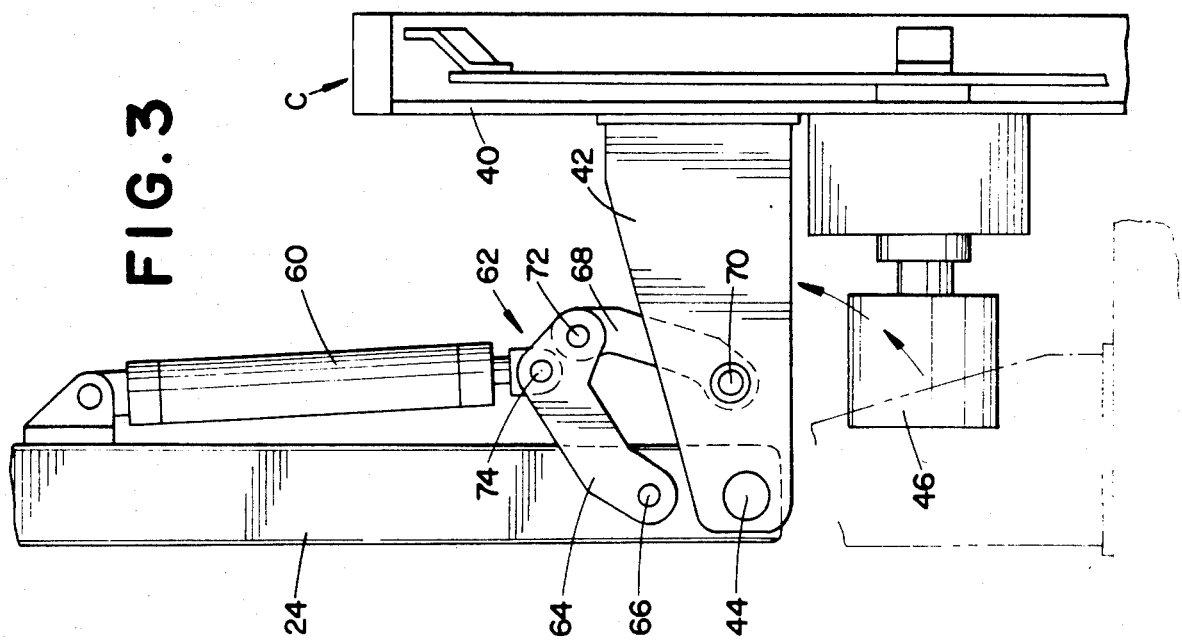
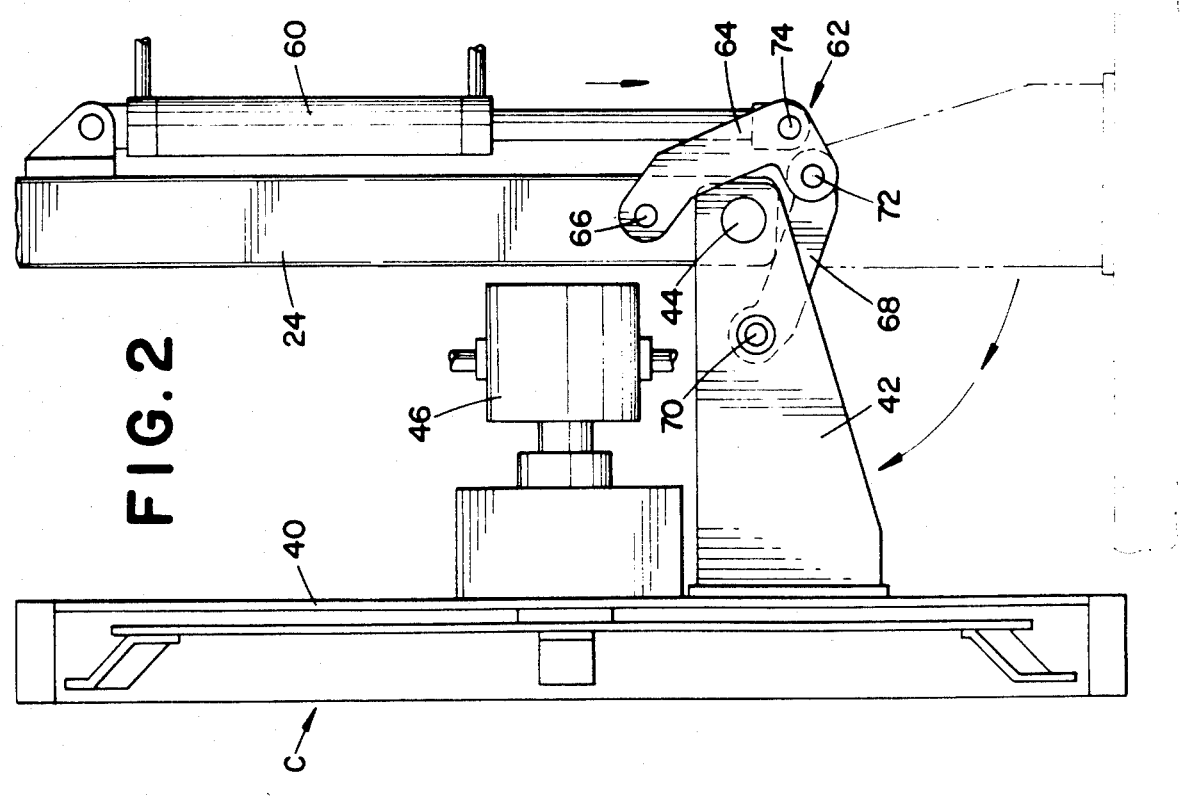

4,502,269

HYDRAULIC MOWER HEAD ORIENTING APPARATUS FOR BOOM MOWERS

BACKGROUND OF THE INVENTION

The invention relates to the art of mowing and mowing apparatus. The invention finds particular application in conjunction with boom mowers and will be described in particular reference thereto.

Heretofore, mowing apparatus have been connected with tractors in various manners. Articulated boom assemblies have been found to be particularly advantageous for supporting mowing apparatus on tractors. The boom assembly included a plurality of arms, a first of which was pivotally connected with a tractor and a second of which was pivotally connected between the mowing apparatus and the first arm. Hydraulic cylinders were provided to control the angular orientation of the first arm relative to the tractor and the second arm relative to the first. This enabled the boom assembly to reach over guardrails and other structures to position the mowing apparatus. It was further necessary to control the angular orientation of the mowing apparatus relative to the second boom arm such that it conformed with the desired mowing pitch.

To control the orientation of the mowing apparatus, a toothed gear was rigidly mounted to the mowing apparatus with its axis through the pivot which connects the mowing apparatus and the second arm. A second tooth gear was mounted freewheeling on the second arm and a flexible chain extended around the two gears. By moving the chain, the angular orientation of the mowing apparatus was readily selectable. To control the positioning of the chain, a hydraulic cylinder was connected at one end with the second arm and at its other end with the chain. By extending and contracting the hydraulic cylinder, the chain could be moved in either direction and the angular orientation of the mowing apparatus controlled.

Although the chain drive angular orientation control mechanism has been successful, it has had drawbacks. For example, the chain drive tended to become fouled with debris. Frequent maintenance to clean the chain and check for wear were commonly required. Further, the drive chain was apt to break under severe conditions.

The present invention contemplates a new and improved angular orientation control mechanism for mowing apparatus which overcomes the above referenced problems and others. The present invention accommodates adverse bank or ravine conditions as well as various orientations or degrees of extension of the boom arms. The mowing apparatus angular orientation control mechanism is able to control the orientation of the mowing apparatus over a range of about 180°.

SUMMARY OF THE INVENTION

In accordance with the present invention, there is provided a boom mowing apparatus. A boom assembly is operatively connected at one end with a prime mover and at its other end with a mowing apparatus. The mowing apparatus is pivotally mounted to the boom assembly such that it is able to assume a plurality of angular orientations. A hydraulic cylinder and mechanical linkage assembly are connected with the boom assembly and the mowing apparatus for selectively controlling the angular orientation of the mowing apparatus.

In accordance with a more limited aspect of the invention, the linkage assembly includes a first link which is pivotally connected to the boom assembly to convert longitudinal extensive movement of the cylinder into rotational movement and a second link which is pivotally connected with the first link and with the mowing apparatus for amplifying the rotational movement. The hydraulic cylinder is pivotally connected between the links and the boom assembly. The links are dimensioned and positioned on the boom assembly and mower head in such a manner that the first link rotates over a range of about 90° and the mower head rotates over a range of substantially 180°.

A primary advantage of the present invention is that it permits the mower head to be rotated through a wide arc.

Another advantage of the present invention is that it requires less maintenance than a chain drive.

Yet another advantage of the present invention is that it is simpler, yet stronger, then a chain drive.

Still further advantages of the present invention will become apparent upon reading and understanding the following detailed description of the preferred embodiment.

BRIEF DESCRIPTION OF THE DRAWINGS

The invention may take form in various parts and arrangements of parts. The drawings are only for purposes of illustrating a preferred embodiment of the invention and are not to be construed as limiting it.

FIG. 1 is an elevational view of a boom mower including a prime mover, a boom assembly, a mowing apparatus, and a mower orientation control mechanism in accordance with the present invention;

FIG. 2 illustrates the mowing apparatus orientation control mechanism of FIG. 1 with the mowing apparatus at one of its extremes of angular movement;

FIG. 3 illustrates the mowing apparatus orientation control mechanism of FIGS. 1 and 2 with the mowing apparatus disposed at its other extreme of angular movement; and, FIG. 4 is a perspective view of the mowing apparatus orientation control mechanism of FIGS. 1, 2, and 3.

DETAILED DESCRIPTION OF THE PREFERRED EMBODIMENT

Figure 4:
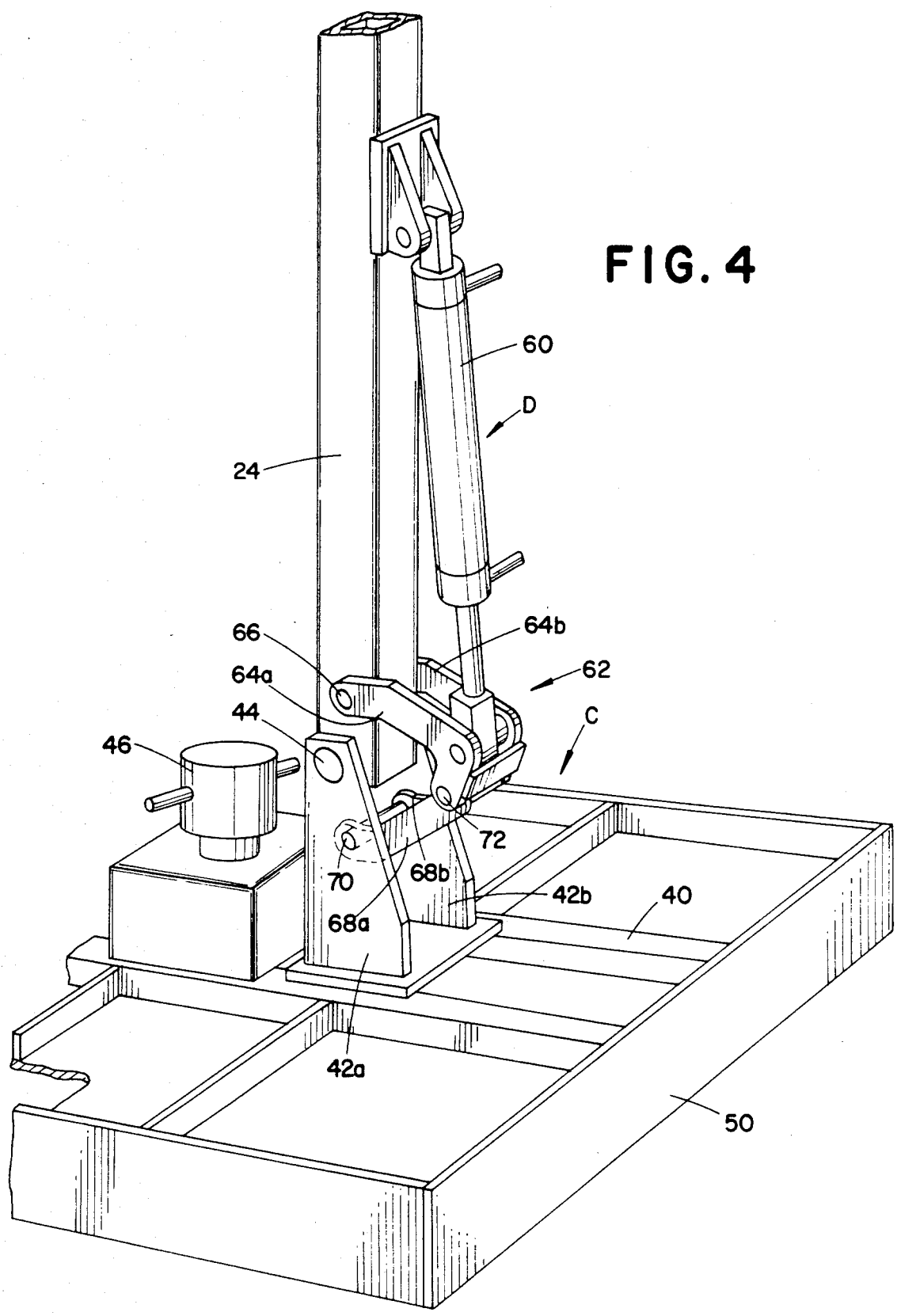

With particular reference to FIG. 1, a prime mover A such as a tractor or the like provides propulsion in at least fore and aft directions as well as a motive power supply for various hydraulic systems. A boom assembly B is connected at one end with the prime mover and at its other end with a mowing apparatus C. An orientation control mechanism D controls the relative orientation between the mowing apparatus and the boom assembly.

The prime mower A includes a hydraulic fluid reservoir 10, a hydraulic pump 12 and various hydraulic control valves (not shown). The boom assembly B includes a generally vertical member or post 20 which is mounted to the prime mover to pivot about a vertical axis. This permits the mower apparatus and the boom assembly to rotate fore and aft, particularly in response to impacting large rocks, posts, or other stationary objects. A first boom arm 22 is pivotally connected with the post 20 and a second boom arm 24 is pivotally connected with the mowing apparatus C and with the first boom arm. A boom arm articulation control means includes a first hydraulic cylinder 26 for controlling the orientation of the first boom arm relative to the prime mover. A second hydrualic cylinder 28 and mechanical linkage 30 control the angular orientation of the second boom arm relative to the first boom arm. Control valves (not shown) for controlling the boom cylinders 26 and 28 are mounted on the prime mover in a position of convenient manual access for the operator.

The mowing apparatus C is illustrated as a rotary mower head, although other mowing apparatus such as a sickle bar, flail mower, and the like are also contemplated by the present invention. The mowing apparatus includes a deck 40 to which an upstanding or follower arm 42 is rigidly connected. In the preferred embodiment, note FIG. 4, the mower arm 42 includes a first mower arm member 42a and a second mower arm member 42b. The mower arm 42 is pivotally connected at pivot interconnection 44 with the second boom arm 24. A hydraulic motor 46 is mounted on the deck for rotating a cutter assembly or blade 48. A skirt 50 extends downward from the deck to protect the operator from objects thrown by the rotatory cutter and to inhibit unauthorized objects from passing into the path of the cutter.

With continued reference to FIG. 1 and particular reference to FIGS. 2 and 3, the mowing apparatus angular orientation controlling means D includes a longitudinally extensible hydraulic actuator 60 such as a hydraulic cylinder, and a kinematic chain or linkage assembly 62. Preferrably, the kinematic chain is constrained such that movement of one link causes a predictable resultant movement in the other links. The kinematic chain assembly transmits the longitudinally extensible movement of the hydraulic cylinder to relative rotational movement between the boom assembly and the mowing apparatus. The cylinder is pivotally connected at a first end with one of the second boom arm and the mowing apparatus, in the preferred embodiment with the boom assembly second arm to facilitate its interconnection with the hydraulic control valve mounted on the prime mover. The linkage assembly 62, in the preferred embodiment, is a four-bar mechanism including a crank or drive link 64 which is connected by a pivot connection 66 with the second boom arm 24 which functions as a frame link. The drive link 64 converts the longitudinal extensive movement into rotational movement about the pivot 66. In the preferred embodiment, the drive link rotates over a range of about 90°. A connection rod or floating link 68 is connected by a pivotal interconnection 70 with the mowing apparatus, or more specifically the mower or follower arm 42. A pivotal connection 72 connects the drive and floating links together. The floating link multiplies the rotational movement of the drive link, in the preferred embodiment by a factor of about 2. A second end of hydraulic cylinder is connected by a pivot 74 with the four-bar linkage assembly, specifically the drive link 64.

To enable the mowing apparatus to be rotated over an arc of 180°, the four-bar linkage assembly 62 is constructed such that at one extreme of the longitudinal cylinder movement, the pivot 70 is to one side of the pivot 44 and at the other extreme of longitudinal cylinder extension the pivot 70 is 180° opposite, i.e. to the other side of pivot 44. The drive link and the floating link are both arcuate or bent with a concave face disposed toward the pivot 44. This enables the drive and floating links to move in close proximity to the pivotally connected ends of the second boom arem and the mower arm. In the preferred embodiment, the drive link is generally L-shaped and the floating link is generally U-shaped. Further to the preferred embodiment, the distance between pivots 66 and 72 is substantially the same as the distance between pivots 70 and 72. It is to be appreciated that by adjusting the length of the drive and floating links, the mechanical advantage or multiplication of rotational movement is adjustable. Further by lengthening both links, the pivots 66, 72, and 74 may be linearly arranged.

With particular reference to FIG. 4, the drive link 64 includes a pair of link members 64a and 64b which are disposed on either side of the second boom arm or frame link 24. The pivotal interconnection 66 is a pin extending through the drive link members and the second boom arm. The floating link 68 similarly includes a pair of link members 68a and 68b. The pivotal connection 70 is a pin which extends between a pair of mowing apparatus arm members or follower links 42a and 42b. The pivotal connection 72 is a pin which extends through the drive and floating link members. The pivotal interconnection 74 is a pin which extends between the pair of drive link members and rotatably receives the second end of the rod of the hydraulic cylinder 60.

The invention has been described with reference to the preferred embodiment. Obviously, modifications and alterations will occur to others upon reading and understanding the preceding detailed description of the preferred embodiment. It is intended that the invention be construed as including all such alterations and modifications insofar as they come within the scope of the appended claims or the equivalents thereof.

Having thus described a preferred embodiment, the invention is now claimed to be:

1. A boom mower comprising:
   a mowing apparatus including a rapidly rotating member for cutting vegetation, the mowing apparatus including an arm extending rigidly therefrom;
   a boom assembly including at least a first boom arm movably interconnectable with a prime mover and a second boom arm having a pivotal interconnected adjacent an outer end thereof with the mowing apparatus arm;
   a longitudinally extensible and contractable double-acting hydraulic actuator pivotally connected at a first end with the second boom arm, the hydraulic actuator being disposed exterior of the second boom arm, whereby the second boom arm may have a relatively small internal cross section; and,
   a kinematic chain assembly disposed exterior of the second boom arm for converting the longitudinal extension and contraction of the hydraulic actuator into 180° of the mowing apparatus arm rotation, the kinematic chain assembly including:
   (i) an L-shaped drive link having a first portion which has a first pivotal connection at one end with the second boom arm and is integrally connected at an elbow region with a second portion that extends away from the hydraulic actuator, a second end of the hydraulic actuator being pivotally connected with the drive link elbow region, the first pivotal connection being disposed closer to the second boom arm outer end than to the drive link elbow region such that drive link second portion is arranged to be disposed closely adjacent to and around the second boom arm outer end, the drive link being rotatable around the first pivotal connection through an arc of generally 90°, the L-shaped drive link being disposed exteriorly of the second boom arm;

(ii) floating link having a first pivotal joint at a first end with the second portion of the drive link and having a second pivotal joint at a second end with the mowing apparatus arm, the floating link being disposed exteriorly of the second boom arm and the mower boom arm and having a concave face facing toward the second boom arm, the floating link being movable along an arcuate path with the concave face moving around and closely adjacent to the second boom arm outer end, the floating link amplifying the movement of the drive link such that 90° of drive link rotation produces substantially 180° of mower apparatus arm rotation, whereby a distance between (1) the pivotal connection between the hydraulic actuator second end and the drive link elbow region and (2) the pivotal joint between the floating link second end and the mower apparatus arm varies with extension and contraction of the hydraulic actuator;

(iii) the L-shape of the drive link and the concave face of the floating link providing clearance between the second boom arm and the floating link as the hydraulic actuator extends and contracts such that the L-shaped drive link and the floating link move in close proximity to the second boom arm;

the hydraulic actuator and the kinematic chain selectively control the orientation of the mowing apparatus relative to the second boom arm such that longitudinal motion of said hydraulic actuator rotates the elbow region of said drive link 90° around the pivotal connection between the one end of the drive link and the second boom arm and said floating link second pivotal joint is rotated 180° around the pivotal interconnection between the mowing apparatus and the second boom arm.

2. A boom mower comprising:

a mowing means for cutting vegetation, the mowing means having a member for receiving a pivotable interconnection;

a boom assembly including a first boom arm movably interconnectable to a prime mover and a second boom arm pivotally interconnected at one end with said first boom arm and at an outer end with said mowing means member;

a hydraulic actuator mounted on the exterior of said second boom arm on an underside thereof and having longitudinally separated extensible and contractable positions, the hydraulic actuator being operatively connected at a first end with said second boom arm, whereby the hydraulic actuator is readily accessible for assembly and maintenance;

a first link means having an L-shape with first and second ends, and an elbow region defining a concave edge disposed between said first and second ends, a first connection located at said first end and pivotally coupled to said second boom arm, a second connection located at said elbow region and pivotally coupled to a second end of said hydraulic actuator, and a third connection located at said second end in closer proximity than said first connection to said second connection, said concave edge being oriented toward said second boom arm outer end, the first link means converting longitudinal motion of said hydraulic actuator into rotational motion such that said second connection follows an arc of substantially 90° around said first connection as said hydraulic actuator moves between said extensible and contractable positions; and a second link means having first and second ends, a concave edge extending between said second link first and second ends oriented toward said second boom arm outer end, a first joint located at said first end and pivotally coupled to said mowing means member, a second joint located at said second end and pivotally coupled to said third connection, the second link means amplifying rotational movement of said first link means such that said first joint follows an arc of substantially 180° around said second boom arm outer end as said hydraulic actuator linearly moves between said extensible and contractable positions.

* * * * *